UNITED STATES PATENT OFFICE.

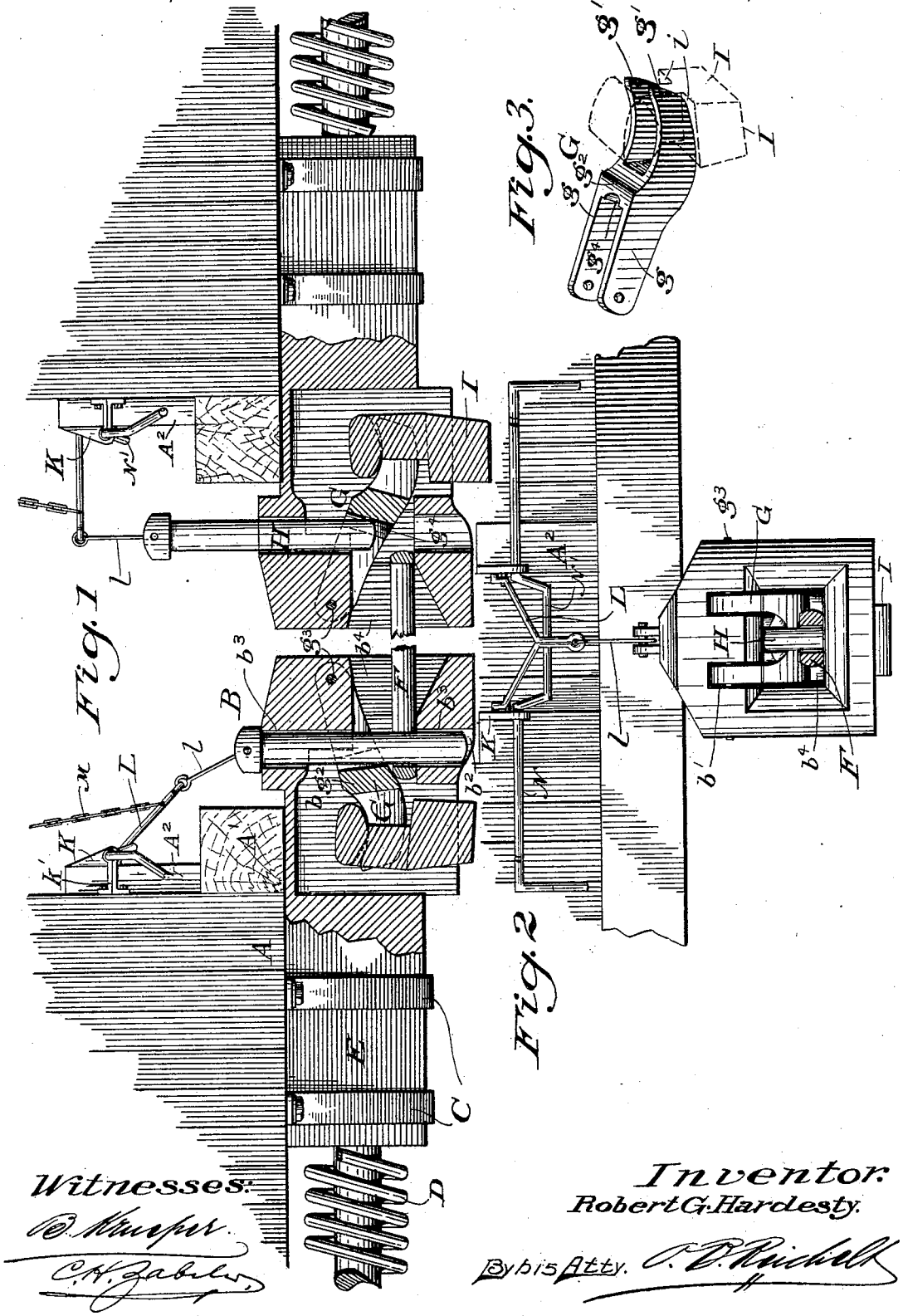

ROBERT G. HARDESTY, OF BIRMINGHAM, ALABAMA.

CAR-COUPLING.

SPECIFICATION forming part of Letters Patent No. 599,901, dated March 1, 1898.

Application filed December 7, 1896. Serial No. 614,729. (No model.)

*To all whom it may concern:*

Be it known that I, ROBERT G. HARDESTY, a citizen of the United States, residing at Birmingham, in the county of Jefferson and State of Alabama, have invented certain new and useful Improvements in Car-Couplings, of which the following is a specification.

My invention relates to link-and-pin car-couplers wherein the pin is supported by a dog pivoted to the walls of the draw-head in such manner that the coupling-pin will be held up thereby until the dog is lifted by the entrance of the link within the draw-head and the coupling-pin is released thereby and allowed to drop into the link.

The object of my invention is to provide a simple, strong, durable, and effective device which will act with certainty at all times; and the improvement consists in certain constructions and combinations of parts hereinafter particularly described and claimed.

In the accompanying drawings, which illustrate my invention, Figure 1 is a side elevation of the adjacent ends of two cars, with their coupling-heads partly in section, with the link broken at the middle, showing one part held by my improved coupler and the other part of the link in position at the mouth of the opposite coupling-head before it is coupled; Fig. 2, a front elevation of the coupler and fragments of the car in position shown at the left in Fig. 1; Fig. 3, a perspective view of the dog for supporting the coupling-pin and link, with the weight attached thereto shown by dotted lines.

Beneath the car-body A and end sill A' of the ordinary box-car are attached the draw-heads B by means of straps C to admit of limited draw or endwise movement against the action of the spring D upon the draw-bar E, of usual construction.

The draw-head B has a cavity $b$ and two side recesses $b'$ opposite the center line thereof, a bottom extension or recess $b^2$, a pin-hole $b^3$, passing vertically through the draw-head, and a mouth $b^4$, with flaring walls, into which the end of the link F is introduced.

A dog G, having side pieces $g\ g$ at the forward end, jaw extensions $g'\ g'$ at the rear end thereof, and a connecting-bridge $g^2$ between said jaw and side pieces, is pivotally secured by a pin $g^3$, fitted crosswise through the draw-head and through the forward ends of the side pieces $g\ g$, the latter being held thereby within the two side recesses $b'$ of the draw-head to freely rise and fall therein. The bridge $g^2$ is recessed at $g^4$ to fit around and receive a coupling-pin H, which is held vertically in the hole $b^3$ of the bumper and when lifted up, as shown at the right-hand side of Fig. 1, is supported in its raised position by the bearing of the dog G. A weight I, recessed at the sides $i$, is supported upon and between the rearwardly-extended jaws $g'\ g'$ and serves to hold the dog G firmly down upon its seat within the draw-head, so that it cannot be lifted up by the jar or jolting of the car and can only be lifted squarely up a sufficient height to drop or let go the coupling-pin by the entrance of the link into the draw-head, and when the said link is pushed fully into the draw-head its inner end will rest beneath the weighted end of the dog and will be held securely in a horizontal position, as shown at the left-hand side of Fig. 1, to allow its free end to be presented squarely to the connecting-bumper. In fitting the weight and dog in place the weight is first passed up through the opening in the bottom of the bumper, and the dog is passed in through the front or mouth of the bumper, and its jaws pass through the recesses in the sides of the weight. The side pieces are then lifted up into their recesses and the cross-pin or pivot-bolt is passed through them and also through the bumper.

The pin is lifted from the sides or from the top of the box-car by the following-described means: Wooden cleats $A^2$ are secured to the forward end of the car A and to the front cross-sill A', and bracket-pieces K are secured to the inner sides thereof to receive and support a forked arm L, the free or vibratory end of which is connected by link or links $l$ with the upper end of the coupling-pin. The fork L, and the pin connected therewith, is lifted from the top of the car by a chain M, leading from said fork to the top of the car, and the said fork and pin are lifted from either side of the car by a crank-shaft N, supported horizontally across the car-body above the front cross-sill by means of the bracket-pieces K at the middle and near the crank portion N' thereof, and also supported at its ends by brackets $k'$, secured to the front of the car, the said crank-shaft N being provided with handles projecting therefrom at the sides of the car. It will be readily understood that the fork L is lifted by the cranked portion N' of the shaft N pressing beneath it.

The device above described will operate with certainty, and the parts are so formed and put together that they will stand all the strains and requirements to which they are subjected.

I claim as my invention and desire to secure by Letters Patent—

In a car-coupling, the combination with the draw-head of a vertically-moving pin adapted to move in a corresponding aperture therein; a dog provided with forward side pieces pivoted thereto and having rearwardly-projecting jaws and a weight adapted to be held upon said rearwardly-projecting jaws, substantially as described.

In testimony that I claim the foregoing as my invention I have signed my name in the presence of two subscribing witnesses.

ROBERT G. HARDESTY.

Witnesses:
  F. M. WOOD,
  T. L. FRANCIS.